UNITED STATES PATENT OFFICE 2,031,023

RHODAMINE COLORING MATTERS AND PROCESS FOR PREPARING THE SAME

Max Wyler, Blackley, Manchester, England, assignor to Imperial Chemical Industries Limited, a corporation of Great Britain No Drawing. Application June 28, 1934, Serial No. 732,928. In Great Britain June 30, 1933

9 Claims. (Cl. 260—62)

This invention relates to new coloring matters of the rhodamine series.

It is an object of this invention to produce new organic compounds of the rhodamine series useful as lake coloring matters. It is a further object of this invention to produce compounds of the rhodamine series which may be rendered soluble by sulfonation, thereby adapting them for use as dyestuffs for textile material. Other and further important objects of this invention, will appear as the description proceeds.

I accomplish the objects of my invention by synthesizing new organic compounds of the rhodamine series from the usual alkyl-amino-phenols employed for this purpose and naphthalene-2,3-dicarboxylic acid or its anhydride. The novel compounds thus produced are characterized by possessing in their structure the fundamental nucleus

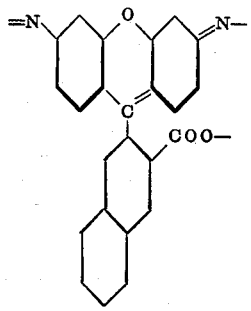

wherein the N atoms are substituted by the usual alkyl radicals or hydrogen, or inorganic acid radicals, and the O atom of the COO group is substituted by hydrogen, an alkali-metal, or an alkyl radical, or it forms an inner ring with the adjacent C atom. As in the case of the orinary rhodamine compounds, my novel compounds may be isolated as a salt, such as the hydrochloride or sulfate, or they may be esterified. They may also be sulfonated to impart to them water-solubility, as more fully described below.

My process of synthesizing these novel compounds is analogous to those used in the art for syntherizing rhodamine colors in general, except that instead of phthalic acid or anhydride I use naphthalene-2,3-dicarboxylic acid or its anhydride. In other words, my process consists generally of reacting one mole or an excess of one mole of naphthalene-2,3-dicarboxylic acid with two moles of an alkyl amino-phenol, preferably in the presence of a metal halide condensing agent.

Heretofore, neither naphthalene-2,3-dicarboxylic acid nor its anhydride have been used for the manufacture of rhodamine coloring matters or dyestuffs. I have now found that they may replace phthalic acid or anyhdride in the manufacture of rhodamines by methods known per se from N-alkyl- or NN-dialkyl-aminophenols. The resulting new unsulphonated rhodamine dyestuffs are similar in shade to the corresponding known rhodamines from phthalic acid, but are insufficiently soluble in water to be valuable in textile dyeing, although they can be used as lake coloring matters. I have found, however, that they can be sulfonated with ease by known methods and that the sulfonated products are acid dyes which, for instance, dye wool in brilliant shades of good to very good fastness.

The following examples in which parts are by weight illustrate but do not limit the invention.

Example I 21.6 parts of naphthalene-2,3-dicarboxylic acid, 16.5 parts of diethyl-m-aminophenol, and 10.0 parts of fused zinc chloride are mixed and heated gradually to 200° C. and kept at this till the melt becomes nearly solid. The melt is allowed to cool, ground and extracted with warm water to remove zinc salts. The resulting insoluble matter is then stirred at 50° C. with 100 parts of 10% aqueous caustic soda, filtered, washed and recrystallized from toluene. The resulting base is in beautiful orange-colored needles. It can be converted to sulphate by dissolving in boiling dilute sulphuric acid and then adding a little sodium chloride to convert the resulting gelatinous product into crystals. It dyes tannin-mordanted cotton in the same shade as rhodamine B ("Colour Index" No. 749), but it is not sufficiently soluble to find practical application in this way.

Sulfonation is effected by dissolving the melt after washing with water and drying, in 150 parts of 100% sulphuric acid below 20° C., adding 40 parts of 60% oleum below 60° C. and keeping at 60° C. until a sample is completely soluble in soda ash solution. The sulfonation mixture is poured into 1000 parts of ice water, filtered, washed free from acid, dried and mixed with 20% of its weight of soda ash.

It dyes wool brilliant bluish-red shades with outstanding levelling and fastness properties.

*Example II*

By replacing in Example I, 16.5 parts of diethyl-m-aminophenol by 13.7 parts of monoethyl-m-aminophenol, but otherwise proceeding in the same manner a more insoluble product is obtained, the sulphate of the base being very insoluble even after esterification. The base is sulfonated as in the previous example and the resulting product dyes wool a bright red-orange shade of very good fastness.

*Example III*

Instead of 16.5 parts of diethyl-m-aminophenol in Example I, 15.1 parts of ethylamino-p-cresol are taken. After the melt has been washed free from zinc chloride and the product decomposed with dilute caustic soda solution and dried, the base is esterified in the following way: 10 parts of base are dissolved in 40 parts of 100% sulphuric acid, 300 parts of ethanol are added and heated under reflux at 100° C. for 12 hours. The reaction product is poured into 500 parts of water, filtered and dissolved in 750 parts of boiling water, and the solution left to crystallize. The new rhodamine separates in lustrous green crystals. It dyes and prints tannin-mordanted cotton in shades very similar to but slightly brighter than Rhodamine 6GBS. It is insufficiently soluble to find practical application per se. However, by sulfonating the zinc free melt in exactly the same manner as described in Example I a color is obtained which dyes wool fast red.

It will be understood that many variations and modifications are possible in my preferred mode of procedure, without departing from the spirit of this invention. In general, since the reaction runs along analogous lines with the ordinary rhodamine synthesis, it will be understood that all the modifications, improvements and variations practiced in the synthesis of known rhodamine colors may be applied to the synthesis and use of my new colors above described, without departing from the essence of this invention.

In the claims below, where new compounds, products, or dyestuffs are claimed, it will be understood that I intend to cover the same not only in substance, but also in whatever state they exist when applied to material, dyed, printed or pigmented therewith.

I claim:

1. A rhodamine compound of the general formula

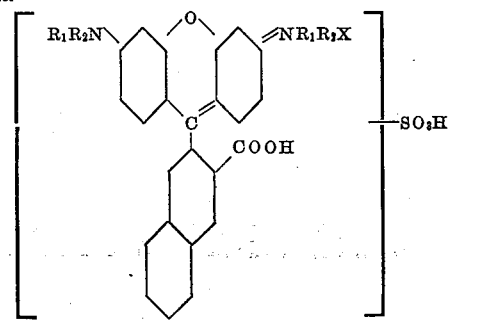

wherein $R_1$ stands for a lower alkyl radical, while $R_2$ stands for hydrogen or a lower alkyl radical, X stands for the radical of a highly ionizable inorganic acid, and the phenyl nuclei to which the N atoms are attached may carry further simple monovalent nuclear substituents of the type generally employed in the aryl nuclei of rhodamine dyestuffs.

2. A dyestuff for wool comprising the sulfonic acid of a rhodamine compound obtainable by subjecting naphthalene-2,3-dicarboxylic acid or its anhydride and a meta-alkylamino-phenol to rhodamine synthesis.

3. A dyestuff for wool comprising the sulfonic acid of a rhodamine compound obtainable by fusing naphthalene-2,3-dicarboxylic acid with a meta-alkylamino-phenol in the presence of zinc chloride.

4. A process for producing a coloring compound, which comprises subjecting a compound selected from the group consisting of naphthalene-2,3-dicarboxylic acid and its anhydride and a meta-alkylamino-phenol to rhodamine synthesis, and sulfonating the reaction product.

5. A process for producing a coloring compound, which comprises fusing naphthalene-2,3-dicarboxylic acid with a meta-alkylamino-phenol in the presence of zinc chloride, and recovering the water insoluble organic compound.

6. A process for producing a coloring compound, which comprises fusing naphthalene-2,3-dicarboxylic acid with a meta-alkylamino-phenol in the presence of zinc chloride, and subjecting the reaction product to sulfonation.

7. A dyestuff for wool comprising the sulfonic acid of a rhodamine compound obtainable by fusing naphthalene-2,3-dicarboxylic acid with diethyl-m-aminophenol in the presence of zinc chloride.

8. A dyestuff for wool comprising the sulfonic acid of a rhodamine compound obtainable by fusing naphthalene-2,3-dicarboxylic acid with monoethyl-m-aminophenol in the presence of zinc chloride.

9. A dyestuff for wool comprising the sulfonic acid of a rhodamine compound obtainable by fusing naphthalene-2,3-dicarboxylic acid with ethylamino-p-cresol in the presence of zinc chloride.

MAX WYLER.